Aug. 2, 1955     C. E. IRION ET AL     2,714,571
PROCESS FOR BONDING A POLYETHYLENE FILM TO A FIBROUS WEB
Filed April 8, 1952
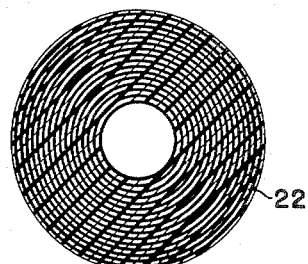
FIG. 1
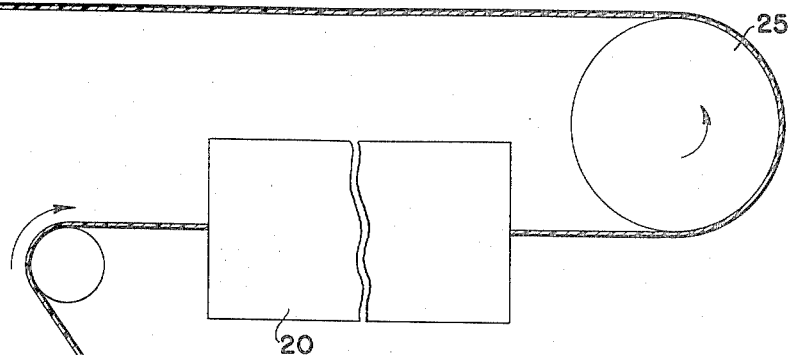
FIG. 3
FIG. 2
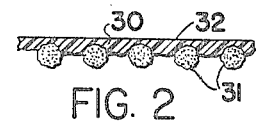
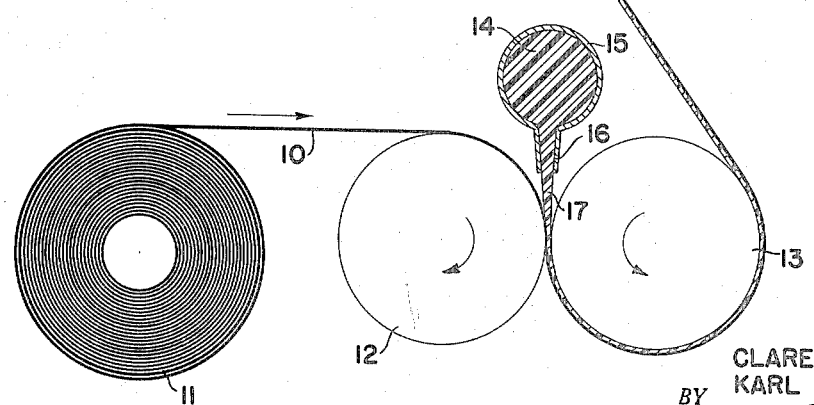
*INVENTORS*
CLARENCE E. IRION
KARL E. PRINDLE
BY Ely, Frye & Hamilton
ATTORNEYS 2,714,571
PROCESS FOR BONDING A POLYETHYLENE FILM
TO A FIBROUS WEB Clarence E. Irion, North Pownal, Vt., and Karl E. Prindle, Shaker Heights, Ohio, assignors to The Dobeckmun Company, Cleveland, Ohio, a corporation of Ohio Application April 8, 1952, Serial No. 281,162

7 Claims. (Cl. 154—139)

The present invention relates to a coated web and more particularly to a polyethylene coated fibrous web.

For a number of years polyethylene has been recognized as a promising protective coating material. Polyethylene is chemically inert to a wide range of substances. It remains flexible at low temperatures. Its moisture-vapor permeability is very low. It is tough, extensible and abrasive resistant. It has high tear strength. It is odorless, tasteless and non-toxic. Polyethylene can be formed or shaped by thermal means without additives. It has a low specific gravity so that a polyethylene film of given thickness will cover a relatively large area per pound.

These characteristics of polyethylene have lead to attempts by the web processing industry to utilize polyethylene coatings in fabrication of protective coated webs and have fostered the production of acceptable light duty packaging materials consisting of polyethylene coated papers. However, all efforts to provide a heavy duty polyethylene coated web have been frustrated by the problem of securing a firm bond between the polyethylene film and a reinforcing fibrous web. In an effort to overcome the problem of bonding, polyethylene coated webs have been produced employing a polyethylene film much thicker than that required for protective purposes. These thick-film coatings represent an attempt to exploit the additional film strength thus attained to enable the poorly bonded portions of the film to be anchored by such neighboring relatively strongly bonded areas as may occur. These thick film coatings have proved to be impractical; particularly objectionable is their relatively high cost of manufacture and handling and their stiffness.

The inability to securely bond a polyethylene film to a fibrous web has therefore obliged the continued use of the relatively expensive and unsatisfactory tackified resinated rubber base films which have for some time been employed in heavy duty packaging and protective materials such as fabric-backed tapes and industrial aprons. These materials must be expensively fabricated with additives, and are broken down by soaps and other alkalis as well as by many acids and greases.

We have discovered a way to attain a very firm bond between a polyethylene film and a fibrous web. Our invention makes possible the provision of inexpensive high strength polyethylene wrappings, tapes and industrial aprons. Moreover, because polyethylene may be easily and cheaply embossed and may be colored with pigments or dyes, we have opened the way for manufacture of very inexpensive and sturdy artificial leathers, furniture and surfacings, luggage coverings and similar materials. Our invention also makes possible the manufacture of paper-backed polyethylene films having a firmer bond between the film and backing than has been attained heretofor.

Other advantages of our invention will appear in the following specification and in the accompanying drawings in which:

Figure 1 is a schematic cross-sectional view of apparatus which may be used in the practice of our invention.

Figure 2 is a schematic cross-sectional view of a conventional polyethylene coated fibrous web.

Figure 3 is a view similar to Figure 2, showing a polyethylene coated fibrous web produced by our invention.

Molten polyethylene may be readily extruded in the form of a thin viscous film. In fabrication of protective wrappings, it has been the practice to continuously extrude and deposit such a film on a passing web of backing material. The molten polyethylene and the backing web are then pressed together by being passed around a first roll with the backing web on the outside. A second cooperating roll is usually provided which contacts the backing web and bears against the first roll to provide higher bonding pressure and more positive pressure control. Thus, at the initiation of the pass, the molten polyethylene is forced into the interstices in the backing web. The polyethylene film is tacky at temperatures near that at which it is extruded and it is, therefore, necessary both to solidify the film and to cool it to a non-tacky temperature before it is led away from the polyethylene-contacting roll in order to prevent sticking and lift-off. This is accomplished by maintaining the polyethylene-contacting roll at a cool temperature through the provision of an internal roll coolant or other similar means. This roll also may be polished to impart a gloss to the roll contacting surface at the polyethylene film. As the polyethylene passes around the roll (usually at least a one-third wrap) it solidifies and cools, leaving the roll as a solid continuous sheet of polyethylene which covers and permeates the backing web.

It will be understood that the process just described involves the permeation of the backing web by molten polyethylene which is allowed to cool to approximately room temperature or below while in seemingly intimate contact with the web fibers. However, despite these seemingly optimum conditions, the bond between the polyethylene film and the backing web is weak. As previously stated, this poor bonding has precluded the fabrication of heavy duty wrappings and tapes, particularly those attempting to employ a fabric web as a backing.

We have discovered that if a polyethylene film is deposited on a fibrous web backing and allowed to cool down to or approaching room temperature, as outlined above, and is then reheated substantially above room temperature and again cooled, a startling increase in bonding strength is attained. Under commercial conditions the bond between the polyethylene film and its backing is increased more than twentyfold. Moreover, the polyethylen film acquires an almost specular gloss which is much brighter than that imparted by a polished roll.

Empirically, the great increase in bond strength upon reheating and subsequent cooling is apparent. However, a theoretical explanation of this phenomenon does not readily suggest itself. The postulation of a mere increase in mechanical adhesion and interlock (as distinguished from specific adhesion attributable to intermolecular forces) is negatived by the manyfold increase in bond strength and by the fact that optimum conditions for mechanical penetration and anchorage (forced penetration of molten polyethylene followed by cooling) fail to render a strong bond. Apparently there is actually a marked increase in the specific adhesion between the film and backing, although there is no clear physical explanation for such increase.

The high polyethylene gloss which is induced by our reheating treatment is probably the manifestation of regular alignment and extremely close packing of the long polyethylene molecules. Molecule alignment is initiated by the working and stretching of the film incident to the initial laminating and rolling operation. In fact, it has been a frequent practice in the past to laminate at a higher speed than the speed of extrusion of the polyethylene sheet, thus deliberately inducing film elongation. Our reheating treatment apparently allows a resetting and therefore even closer packing of the polyethylene molecules which have been aligned by elongation.

In Figure 1 we have illustrated schematically an apparatus for carrying out our invention. A web of backing material 10 from a feed roll 11 is passed between a pair of counter-rotating rolls 12 and 13. The roll 12 has a resilient rubber surface and the roll 13 a steel surface. Molten polyethylene 14 under pressure is supplied in extrusion chamber 15. The polyethylene is extruded out a long narrow orifice 16 in the form of a free film 17 which is deposited on the backing web 10 near the nip between the rolls 12 and 13. The deposited film and backing web 10 thereupon pass between the rolls 12 and 13 and the backing web is impregnated with the molten polyethylene. An internal coolant conducts heat away from the surface of the roll 12. The polyethylene film is cooled as it passes around this roll and finally is taken off the roll as a solid continuous non-tacky coating on the backing web 10. The polyethylene coating is then reheated to tackification by passage through a suitable heating chamber 20. Upon subsequent cooling the coated web is stored on rewinder 22. Upon leaving the heating chamber 20 the coated web may be passed around a cooling roll 25 similar to the roll 12 to accelerate recooling and minimize the space required for handling of the coated web between the heating chamber 20 and the rewinder 22.

Although it will be understood that our invention is adapted to increase the bond strength of polyethylene coated papers, felts, unwoven cloths and other fibrous web backings, we have chosen for specific illustration a practical embodiment of our invention adapted to greatly enhance the bond strength of a polyethylene coated woven cotton fabric.

In one particular embodiment, we utilize a woven cotton fabric weighing approximately .18 pounds per yard and having from 40 to 44 threads per inch. Polyethylene of a molecular weight of about 19,000 is supplied through the orifice 16 at a temperature of about 600° F. The roll 13 is maintained at a temperature of approximately 50° F., cooling the polyethylene film to below 150° F. The coated web is exposed to a heat of 350° F. within the chamber 20 for fifteen seconds, heating the polyethylene coating to at least 225° F. Web speed is approximately 80 feet per minute. The orifice 16 is about .03 inch wide and the thickness of the elongated and deposited film is somewhere around one tenth of this latter figure, or approximately .003 inch. Following the reheat step the web cools below 100° F. to room temperature.

The coated fabric, before reheating, has the conformation schematically illustrated in Figure 2. The polyethylene film 30 bridges straight across the fabric threads 31. The flat somewhat glossy upper surface 32 of the film is imparted by the roll 13.

After reheating, the coated fabric has the conformation illustrated in Figure 3. The film 30 tends to slump between the threads 31, giving the coating a ridged or cross-hatched appearance when viewed from above. The upper surface 32 of the film has a high gloss of pleasant appearance. Even on the lower surface of the film a gloss is occasionally visible through the fabric voids.

Many changes in the specific features of the process disclosed herein will suggest themselves to those familiar with the technics of web processing. Accordingly, the scope of our invention is not to be limited to these specific features, but is to be defined solely by the following claims.

What is claimed is:

1. The process for bonding a polyethylene film to a fibrous web which comprises the steps of extruding a film of molten polyethylene onto a fibrous web, pressing said film into said web by urging said fibrous web against a roll with said film between said fibrous web and said roll, cooling said film at least to a temperature at which it is non-tacky with respect to the surface of said roll to establish a preliminary relatively weak bond between said film and said fibrous web, removing said film from the surface of said roll, reheating said film to at least 225° F. and thereupon recooling said film to substantially normal environmental temperature to finally establish a strong bond between said film and said web.

2. The process for bonding a polyethylene film to a fibrous web which comprises the steps of extruding a film of molten polyethylene onto a fibrous web, pressing said film partially into said web, cooling said film to below its tacky state, reheating said film at least to its lowest temperature of tackification and recooling said film to substantially normal environmental temperature.

3. In a process for bonding a polyethylene film to a fibrous web backing, the steps comprising extruding a sheet of molten polyethylene from an orifice onto a fibrous web passing by said orifice, forcing said sheet partially through said fibrous web and cooling said sheet to below 150° F. to form a mechanically anchored polyethylene film on said fibrous web, reheating said polyethylene film to at least 225° F. and finally recooling said polyethylene film to below 150° F.

4. A process for fabricating a coated fibrous web which comprises the steps of permeating one side of a fibrous web with a continuous film of molten polyethylene, cooling said film to below 150° F. while said film is in permeating relationship with said fibrous web to establish a preliminary relatively weak bond between said film and said web, reheating said film to at least 225° F. and thereupon recooling said film to substantially normal environmental temperature to finally establish a strong bond between said film and said web.

5. The process for fabricating a coated fibrous web which comprises the steps of placing a film of molten polyethylene on a fibrous web, pressing said film into said web by urging a pressing member and said fibrous web toward each other with said film disposed between them, cooling said film at least to a temperature at which it is non-tacky with respect to the surface of said pressing member to establish a preliminary relatively weak bond between said film and said fibrous web, parting said film and said pressing member, reheating said film to at least 225° F., and thereupon recooling said film to substantially normal environmental temperature to finally establish a strong bond between said film and said web.

6. The process for fabricating a coated fibrous web comprising the steps of placing a film of molten polyethylene along a fibrous web, pressing said film partially into said web, cooling said film to below its tacky state, reheating said film at least to its lowest temperature of tackification and recooling said film to substantially normal environmental temperature.

7. In a process for bonding a polyethylene film to a fibrous web backing, the steps comprising laying a sheet of molten polyethylene on a fibrous web, forcing said sheet at least partially through said fibrous web and cooling said sheet to below 150° F. to form a mechanically anchored polyethylene film on said fibrous web, reheating said mechanically anchored film to at least 225° F. and finally recooling said polyethylene film to below 150° F.

References Cited in the file of this patent

UNITED STATES PATENTS

| 2,219,700 | Perrin et al. | Oct. 29, 1940 |
| 2,541,498 | Calvert | Feb. 13, 1951 |
| 2,598,090 | Yung et al. | May 27, 1952 |
| 2,607,712 | Sturken | Aug. 19, 1952 |

OTHER REFERENCES

"Plastics," Polyethylene, August 1944, pp. 103–107, 174–176.

"British Plastics," Properties and Uses of Polythene, May 1945, pages 208–215.

"Indus. and Engin. Chem.," Polythene, June 1945, pp. 526–533.